United States Patent [19]

Wada et al.

[11] 3,718,916

[45] Feb. 27, 1973

[54] SEMICONDUCTOR MEMORY ELEMENT

[75] Inventors: Toshio Wada; Sho Nakanuma; Tohru Tsujide, all of Tokyo, Japan

[73] Assignee: Nippon Electric Company, Limited, Tokyo, Japan

[22] Filed: Feb. 10, 1971

[21] Appl. No.: 114,304

[30] Foreign Application Priority Data

Feb. 12, 1970 Japan ....................45/12183

[52] U.S. Cl. ....................340/173 R, 317/235 B

[51] Int. Cl. .......G11c 11/40, G11c 5/02, G11c 11/00

[58] Field of Search ..............317/235 B; 340/173 R

[56] References Cited

UNITED STATES PATENTS

| | | | |
|---|---|---|---|
| 3,577,210 | 5/1971 | Dill | 317/235 B |
| 3,590,471 | 7/1971 | Lepselter | 317/235 B |
| 3,556,966 | 1/1971 | Waxman et al. | 317/235 B |
| 3,533,089 | 10/1970 | Wahlstrom | 340/173 R |
| 3,356,858 | 12/1967 | Wanlass | 340/173 R |

OTHER PUBLICATIONS

IBM Technical Disclosure Bulletin, "Integrated High-Speed, Read-Only Memory with Slow Electronic Wnte" by Faber, Vol. 8, No. 3; 8/65; pp. 461–462.

*Primary Examiner*—Stanley M. Urynowicz, Jr.
*Attorney*—Sandoe, Hopgood & Calimafde

[57] ABSTRACT

A semiconductor memory element for use in a memory device having high speed data read out. A semiconductor region of one conductivity type is provided on a substrate of an opposite conductivity. A first electrode is in ohmic contact with the semiconductor region and a second electrode is coupled to the semiconductor region through a rectifying barrier such as a Schottky barrier or a PN Junction.

9 Claims, 7 Drawing Figures

INVENTORS
TOSHIO WADA
SHO NAKANUMA
TOHRU TSUJIDE by Sandoe, Hopgood & Calimafde
ATTORNEYS

*INVENTORS*
TOSHIO WADA
SHO NAKANUMA
TOHRU TSUJIDE

*by* Sandoe, Hopgood & Calimafde
ATTORNEYS

SEMICONDUCTOR MEMORY ELEMENT

BACKGROUND OF THE INVENTION

This invention relates generally to insulated-gate type field effect transistors, and more particularly to a semiconductor memory element used for a semiconductor memory device which permits read operation at high speed.

It is known that the characteristics of insulated gate type field effect transistors (hereinafter called IGFET) are changed by the use of insulating material capable of storing charges by applying a voltage exceeding a critical value to an insulating gate film. IGFET's of this kind commonly have their insulating gate film formed of layers of silicon dioxide ($SiO_2$) and silicon nitride (SiN). In one recently proposed and improved IGFET, alumina having a permanent trapping center is used as an insulating gate film, as described in detail in copending Pat. application Ser. No. 11,426 filed Feb. 16, 1970 now U.S. Pat. No. 3,663,871 and assigned to the same assignee as the present application. IGFET's of the type provided with an insulating gate film having a trapping center have been developed into semiconductor memory elements by making use of a change in their characteristics. With the recent increasing capacity of information processing equipment various types of memory means have been devised. There has been, for example, a remarkable increase in demand for memory devices using IGFET's because of their convenience for achieving larger capacity of data storage. On the other hand, it is absolutely necessary to make it possible to read data from the memory at high speed along with improvement in the capacity of memory devices. Some memory devices using IGFET's having memory functions, which have already been tried, have a cycle-time of about 25 nanoseconds in read-out operation. The number of elements per bit in these devices is increased, but is not sufficient as compared with flip-flop memory circuits using bipolar transistors.

Thus, an object of this invention is to provide a semiconductor memory element, which is simple in structure and high in response speed.

Another object of this invention is to provide a memory circuit using semiconductor memory elements, which permits data read out at high speed.

SUMMARY OF THE INVENTION

The semiconductor memory element of this invention comprises a semiconductor region of one conductivity type provided on one surface of a substrate and electrically isolated from the substrate. An insulating gate film covers a part of the surface of the semiconductor region, a gate electrode is provided on the gate film, and two electrodes are led out from the semiconductor region and are provided at both sides of the gate electrode. One of the latter electrodes are connected to the semiconductor region through a rectifying junction (Schottky barrier or PN junction), the other electrode making ohmic contact with the region. The gate insulating film, made of, for example, alumina, has trapping centers to which electrons are trapped upon the application to the gate electrode of a voltage exceeding a critical value.

In the semiconductor memory element of this invention, the current to flowing through the semiconductor region between the electrode connected through a rectifying barrier (Schottky barrier or PN junction) and an electrode in ohmic contact (ohmic electrode) is controlled by depletion layers spread into the semiconductor region directly under the gate film by negative charges to be stored in the gate film. This memory element permits a write operation by the application of a power source between the gate and ohmic electrodes, and a read operation by making use of the forward characteristic of a Schottky diode or PN junction diode provided between the two electrodes led out from the semiconductor region. Thus, the memory element of this invention has an advantage that a read operation is performed in the high-speed response time of the Schottky diode or PN junction diode, with the read voltage being relatively low, only slightly greater than over the forward rising voltage of that diode.

BRIEF DESCRIPTION OF THE DRAWING

FIG. 3 shows the capacitance-voltage characteristic curves of the embodiment of;

DETAILED DESCRIPTION

Figure 1:
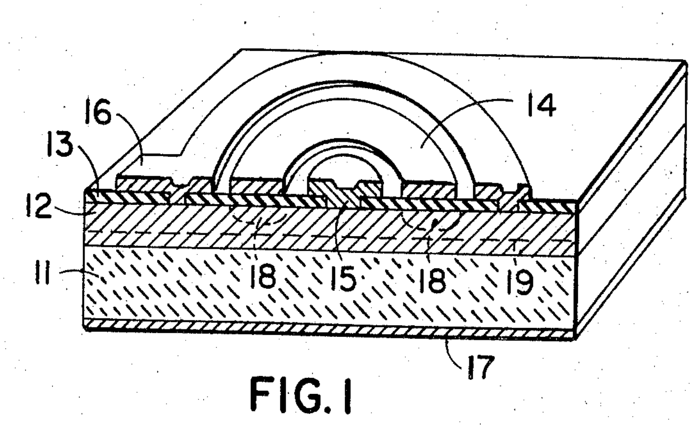
FIG. 1 is a perspective view in vertical cross-section of a main part of a semiconductor memory element in accordance with one embodiment of this invention.

FIG. 1 shows a first embodiment of this invention, where a semiconductor memory element is composed of a P-type silicon single crystal substrate 11 having a specific resistivity of about 0.5 ohm - cm. An N-type silicon epitaxial layer 12 having a thickness of 1 micron and a specific resistivity of 1 ohm - cm is provided on the surface of the substrate and an alumina gate film 13 and having a thickness of 1,800A, including permanent trapping centers is formed on epitaxial layer 12. A ring gate electrode 14 is formed on the alumina gate film, and a molybdenum electrode 15 is enclosed by the gate electrode 14 and connected in Schottky contact to the surface of the epitaxial layer 12. An other ring electrode 16 surrounds the gate electrode 14 and is connected in ohmic contact to the surface of the epitaxial layer 12, and an electrode 17 is connected in ohmic contact with the bottom surface of the substrate 11.

Figure 2:
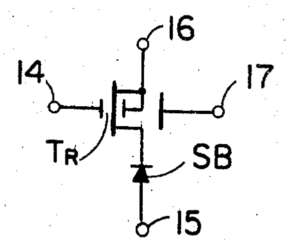
FIG. 2 is a circuit diagram equivalent to the embodiment of FIG. 1.

The memory element in this embodiment has an equivalent circuit including an IGFET(Tr) and a Schottky diode (SB), as shown in FIG. 2 in which elements corresponding to the element of FIG. 1 are designated by corresponding reference numerals. Electrons injected into the alumina film may be captured by applying a voltage over about 35 volts between the insulating gate electrode 14 and the ohmic electrode 16 with an electric field above a critical intensity being applied to the alumina gate film 13. A depletion layer 18, as shown in FIG. 1, is developed in epitaxial layer 12 opposite to the gate electrode 14 as a result of the capture of such electrons. On the other hand, a depletion layer 19 may be spread from the P-N junction defined between the epitaxial layer 12 and the substrate 11, as required, by applying a reverse bias voltage to the substrate electrode 17 and the ohmic electrode 16. Depletion layers 18 and 19 cut off a path for forward current to flow from the Schottky electrode 15 to the ohmic electrode 16. As will be readily understood, such forward current may flow in the event that no electrons are captured, with a positive voltage of about one volt being applied to the drain electrode 15.

Figure 3:
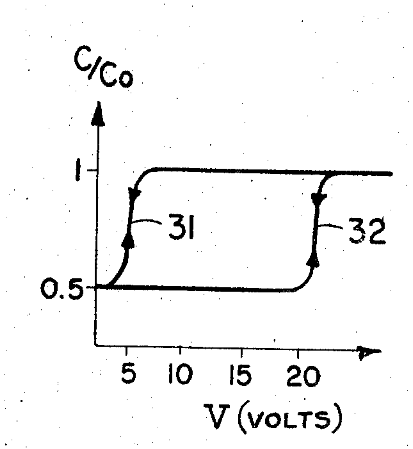

FIG. 3 shows the characteristic curves of an insulated gate type diode composed of gate electrode 14, alumina gate film 13, and epitaxial layer 12 as shown in FIG. 1. A curve 31 indicates a diode characteristic without the capture of electrons, and a curve 32 indicates the other diode characteristic with electrons captured. In other words, the capture of electrons in the memory element in this embodiment can be known by applying a gate bias voltage of between about +7 and +20 volts between the gate electrode 14 and the ohmic electrode 16 as a source electrode.

Figure 4:
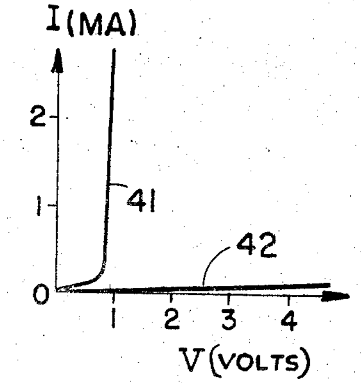
FIG. 4 shows the current voltage characteristic curves indicating the operation and effect of the embodiment of FIG. 1.

FIG. 4 shows the characteristics of forward current flowing through a Schottky diode in the embodiment of FIG. 1. In the memory element without the capture of electrons, forward current having a characteristic indicated by curve 41 flows by applying a gate bias voltage over about +7 volts, as mentioned above. In the memory element with such electrons captured, no forward current flows substantially as indicated by curve 42 with a gate bias voltage below about 20 volts. As shown in FIG. 4 the semiconductor memory element of this embodiment permits easy reading at high speed as a result of the use of the Schottky diode and easy operation with low power as a result of the simplified peripheral circuits because of the low read voltage, which is the substantially forward voltage of the Schottky diode.

Figure 5:
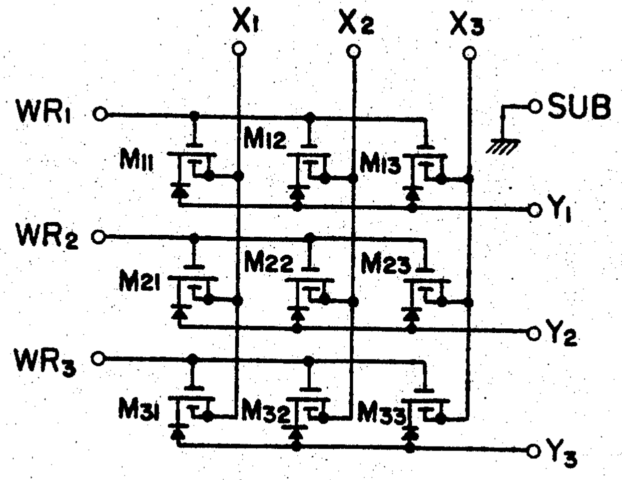
FIG. 5 is a circuit diagram of another embodiment of this invention.

FIG. 5 shows another embodiment of this invention, where a memory circuit is obtained in which a plurality of semiconductor memory elements M11, M12, M21, . . ., . . ., M33 including Schottky diodes and N-channel type IGFET's, as shown in FIG. 1, are provided at the intersection of a matrix wiring consisting of line wires for writing $WR_1$, $WR_2$, $WR_3$, row wires $X_1$, $X_2$, $X_3$, and lines wires for reading $Y_1$, $Y_2$, $Y_3$. Gate, ohmic, and Schottky electrodes in the individual semiconductor memory elements are connected to the write line, row, and read line wires respectively, and substrate electrodes are led commonly to a terminal SUB.

In the memory circuit in this embodiment writing of new data into the memory can be achieved by changing the characteristics of a selected memory element such as element $M_{12}$, with a voltage over a critical point applied, for example, to the write line $WR_1$ on the first line and to the second row wire $X_2$. On the other hand, reading of data from the memory can be achieved at high speed by applying a positive voltage pulse of about 1.5 volts to the read line wire $Y_1$ on the first line and a positive voltage of about 10 volts to the line wire $WR_1$ so that information stored in the memory element $M_{12}$ is chosen by the value of current flowing to the second row wire $X_2$.

Furthermore, in this embodiment a read operation can be controlled by the bias voltage applied to a write line wire (WR) at the time of data read out. Thus, it is possible to make three-dimensional selections by the use of a number of matrix circuits by such bias control. Still furthermore, in this embodiment, a highly practical memory circuit can be obtained by employing a PN junction diode instead of each Schottky diode.

Figure 6A:
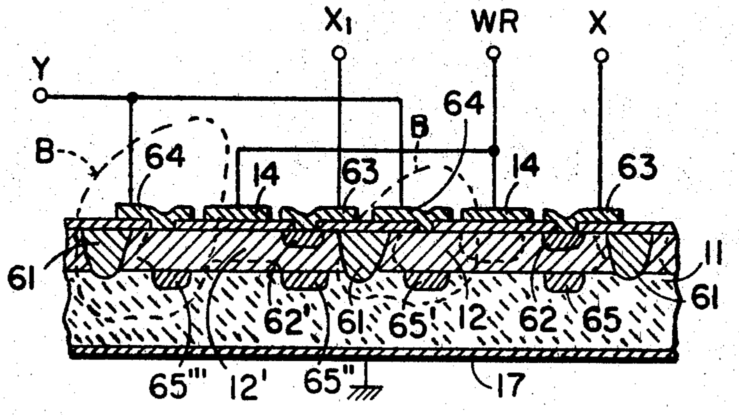
FIG. 6A is a cross-sectional view of a semiconductor integrated circuit device for realizing the circuit of FIG. 5.

FIG. 6A shows another embodiment of this invention, which is an integrated circuit composed of semiconductor memory elements preferable to realize memory the circuit of FIG. 5. The circuit includes a P-type silicon single crystal substrate 11 and, N-type epitaxial layers 12 and 12', formed on the substrate P-type insulating regions 61 diffused into the epitaxial layers, for isolating and electrically separating the N-type epitaxial layers 12 and 12' to form individual semiconductor memory elements. An alumina film 13 covers and is fixed to the epitaxial layers and has a permanent capture center, and aluminum gate electrode 14 crosses and extends from the center of the N-type epitaxial layers 12 and 12', N-type regions 62 and 62' are formed by diffusion into the N-type epitaxial layers 12 and 13' and having have a high surface concentration of $10^{19}$ to $10^{21}/cm^3$. Aluminum source electrodes 63 and 63' are connected in ohmic contact with the N-type regions 62 and 62' respectively, and an aluminum drain electrode 64 is connected in Shottky contact with the N-type epitaxial layers 12 and 12' respectively, in such a manner that the gate electrode 14 is put between the source electrodes and the electrode 64 N-type regions 65, 65', 65'', 65''' of a relatively high concentration are embedded previously into the substrate directly beneath the source and drain electrodes for reducing d-c resistance. Individual memory elements obtained in the N-type epitaxial layers 12 and 12' in the drawing are disposed on the same line, and the gate and drain electrodes 14 and 64 are led to a write and read terminals WR and Y respectively by common wiring. The source electrodes 63 and 63' are connected to terminals X and X' on their respective rows.

Selective write or read operation in this embodiment is performed in a manner similar to that in FIG. 5, and therefore, no further explanation of this embodiment is given here.

Furthermore, electrode processing can be simplified because of the use of the same aluminum electrode to each of the electrodes in this embodiment.

Figure 6B:
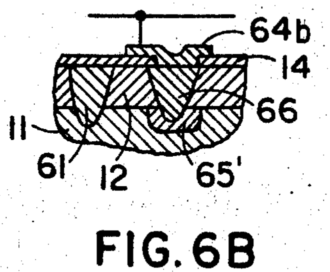
FIG. 6B is fragmentary cross-section of a modification of the device of FIG. 6A.

Referring to FIG. 6B, each of the elements contained within the area enclosed by the broken-line boundary B of FIG. 6A including the Schottky diode may be replaced by the structure of FIG. 6B which includes a PN junction diode. Such a structure can be produced by forming a P-type region 66 having an impurity concentration of $10^{17}$ to $10^{20}$ $cm^{-3}$ in the N-type epitaxial layer 12 (12') and attaching an aluminum electrode **64*b* making ohmic contact with P-type region 66. It is preferable to form the P-type region 66 by impurity diffusion at the same time that the P-type isolation regions 61 are formed. Region 66 is electrically isolated from the substrate 11 by the N-type region 65' (65'''**).

In the above embodiments, a P-type silicon single crystal is used as a substrate, which may be, however, substituted by an insulating single crystal such as intrinsic silicon single crystal or sapphire which is insulated from the semiconductor regions formed thereon. As a semiconductor material germanium or III–V point semiconductors may be used.

Accordingly the, patent to be granted to this invention is not to be limited by the description of the above embodiments thereof but is intended to cover all semiconductor memory elements falling within the spirit and scope of the invention.

What is claimed is:

1. A memory circuit employing semiconductor memory elements comprising a plurality of write line wires, a plurality of row wires, a plurality of read line wires, a plurality of insulating gate type field effect transistors disposed at the intersections of a matrix formed by said write line wires and said row wires, each of said transistors having a substrate of one conductivity type, a thin semiconductor layer of an opposite conductivity type provided on one face of said substrate and insulated electrically therefrom, a first electrode in ohmic contact with said semiconductor layer, a second electrode electrically connected to said semiconductor layer through a rectifying barrier, an insulating gate film covering a part of the surface of said semiconductor layer between said first and second electrodes, said gate film including electron-trapping centers and trapping centers therein where an electric field exceeding a critical point is applied to said gate film, and a gate electrode provided on said gate film, a plurality of diodes disposed at said intersections of said matrix, means for connecting the gate electrode of each of said transistors to a selected one of said write line wires, means for connecting a source electrode of each of said transistors to a selected one of said row wires, means for connecting one of the electrodes of each of said diodes to a drain electrode of one of said transistors, and means for connecting the other electrode of each of said diodes to a selected one of said read line wires.

2. A semiconductor memory element comprising a substrate of one conductivity type, a thin semiconductor layer of an opposite conductivity type provided on one face of said substrate and insulated electrically therefrom, a first electrode in ohmic contact with said semiconductor layer, a second electrode provided on said semiconductor layer through a rectifying barrier, an insulating gate film covering a part of the surface of said semiconductor layer between said first and second electrodes, said gate film including electron-trapping centers and trapping electrons therein when an electric field exceeding a critical value is applied thereacross, a gate electrode provided on said gate film, means for supplying a current between said first and second electrodes through a part of said semiconductor layer under said gate film, the direction of said current passing through said semiconductor layer being limited to the forward direction of said rectifying barrier, and means coupled to said gate electrode for applying an electric field exceeding said critical value across said gate film, whereby a high impedance is produced against said current in said semiconductor layer under said gate film when said electric field is applied across said gate film.

3. The memory element of claim 2, in which said rectifying barrier is a Schottky barrier.

4. The memory element of claim 2, in which said rectifying barrier is a PN junction.

5. The memory element of claim 2, in which said semiconductor region is an epitaxial layer grown on said substrate, and said insulating gate film is an alumina film.

6. The memory circuit of claim 5, further comprising a plurality of insulating regions of said one conductivity type provided in said semiconductor layer for electrically dividing said semiconductor layer into a plurality of individual semiconductor memory elements.

7. The memory circuit of claim 6, further comprising regions of said opposite type formed in said substrate and positioned beneath said first and second electrodes.

8. The memory element of claim 5, in which said rectifying barrier is a Schottky barrier.

9. The memory element of claim 5, in which said rectifying barrier is a PN junction.

* * * * *